United States Patent [19]

Hokao

[11] Patent Number: 5,608,612
[45] Date of Patent: Mar. 4, 1997

[54] ELECTRONIC DEVICE HAVING A FAIL-SAFE SYSTEM FOR MEMORY BACKUP

[75] Inventor: Shigeyuki Hokao, Tokyo, Japan

[73] Assignee: Sony Corporation, Tokyo, Japan

[21] Appl. No.: 531,457

[22] Filed: Sep. 20, 1995

[30] Foreign Application Priority Data

Sep. 27, 1994 [JP] Japan ................................. 6-231814

[51] Int. Cl.$^6$ .................................................. H01M 2/10
[52] U.S. Cl. ........................... 361/814; 361/616; 429/97; 439/500; 455/89
[58] Field of Search .................................. 429/96, 97, 98, 429/99, 100; 439/297, 296, 298, 500; 361/608, 609, 615–617, 622, 625, 679, 683, 814, 724–728; 455/89, 90, 347, 348; 307/150; 364/708.1

[56] References Cited

U.S. PATENT DOCUMENTS

| | | | |
|---|---|---|---|
| 4,662,736 | 5/1987 | Taniguchi | 354/412 |
| 5,039,580 | 8/1991 | Mori | 429/97 |
| 5,149,604 | 9/1992 | Nakanishi | 429/97 |
| 5,328,781 | 7/1994 | Mikake | 429/97 |

*Primary Examiner*—Gerald P. Tolin
*Attorney, Agent, or Firm*—Limbach & Limbach

[57] ABSTRACT

An electronic device using an operation battery and a memory backup battery includes a device body and a memory backup battery removal preventing mechanism. The device body includes a first accommodating portion for accommodating therein the operation battery and a second accommodating portion for accommodating therein the memory backup battery. The preventing mechanism prevents the memory backup battery accommodated in the second accommodating portion from being removed from the second accommodating portion based on whether or not the operation battery is accommodated in the first accommodating portion.

7 Claims, 3 Drawing Sheets

ELECTRONIC DEVICE HAVING A FAIL-SAFE SYSTEM FOR MEMORY BACKUP

BACKGROUND

1. Field of the Invention

The present invention relates to electronic devices and, more particularly to an electronic device using an operation battery and a memory backup battery.

2. Background of the Invention

Electronic devices, such as portable information processing devices, use not only an, operation battery for operating necessary circuit elements, such as an information processor or display provided within a device body but also a memory backup battery in order to back up a memory provided therein when the operation battery is exchanged.

In the electronic device, if the operation battery and the memory backup battery are removed from the device body simultaneously, then data that had been stored so far in the memory are all lost. Therefore, it is necessary to take a step for preventing the user from inadvertently removing the memory backup battery from the device body under the condition that the operation battery was already removed from the device body when the operation battery was exchanged with a new one.

The following means and methods are known to be effective for preventing the user from inadvertently removing the memory backup battery from the device body.

(1) To display warning sentences near a battery loading portion or battery accommodating portion of electronic device or to call user's attention by a label on which warning sentences are written;

(2) To attach a lid to a memory backup battery and fix the memory backup battery lid to the battery accommodating portion of the device body by screws or claws so that the memory backup battery becomes difficult to be removed from the battery accommodating portion by the user; and (3) To switch an operation battery lock mechanism and a memory backup battery lock mechanism and exchange the operation battery and the memory backup battery when they are exchanged with new ones.

However, the method (1) is hardly effective for careless users. The means (2) needs a screw driver when the memory backup battery is exchanged. Moreover, the battery exchange operation becomes cumbersome and inconvenient for the user. Furthermore, the means (3) requires the user to know well how to operate the operation battery lock mechanism and the memory backup battery lock mechanism. Therefore, it is frequently observed that the electronic device could not be energized because the user is not familiar with the lock mechanisms and operates them wrongly.

SUMMARY OF THE INVENTION

It is therefore an object of the present invention to provide an electronic device in which the above-mentioned problems can be solved.

According to the present invention, there is provided an electronic device using an operation battery and a memory backup battery. The electronic device includes a device body and a preventing portion. The device body includes a first accommodating portion for accommodating therein the operation battery and a second accommodating portion for accommodating therein the memory backup battery. The preventing portion prevents the memory backup battery accommodated in the second accommodating portion from being removed from the second accommodating portion based on whether or not the operation battery is accommodated in the first accommodating portion.

According to the present invention, there is provided an electronic device using an operation battery and a memory backup battery as a power supply. The electronic device includes first and second battery accommodating portions and a preventing portion. The first battery accommodating portion is provided on a housing. The first battery accommodating portion accommodates therein the operation battery such that the operation battery can be removed therefrom. The second battery accommodating portion is provided on the housing. The second battery accommodating portion accommodates therein the memory backup battery such that the memory backup battery can be removed therefrom. The preventing portion prevents the memory backup battery accommodated in the second battery accommodating portion from being removed from the second battery accommodating portion when the operation battery is not accommodated in the first battery accommodating portion.

BRIEF DESCRIPTION OF THE DRAWINGS

FIGS. 2A and 2B are plan views used to explain an inadvertent removal preventing mechanism according to this embodiment; wherein FIG. 2A shows the state that an operation battery of the removable preventing mechanism is accommodated in an accommodating portion and FIG. 2B shows the state that the operation battery of the removable preventing mechanism is removed from the accommodating portion; and FIGS. 3A and 3B are plan views used to explain an inadvertent removal preventing mechanism for an electronic device; wherein FIG. 3A shows the state that an operation battery of a removal preventing mechanism is accommodated in an accommodating portion and FIG. 3B shows the state that the operation battery of the removal preventing mechanism is removed from the accommodating portion.

DESCRIPTION OF THE INVENTION

An electronic device according to an embodiment of the present invention will hereinafter be described with reference to the drawings.

Figure 1:
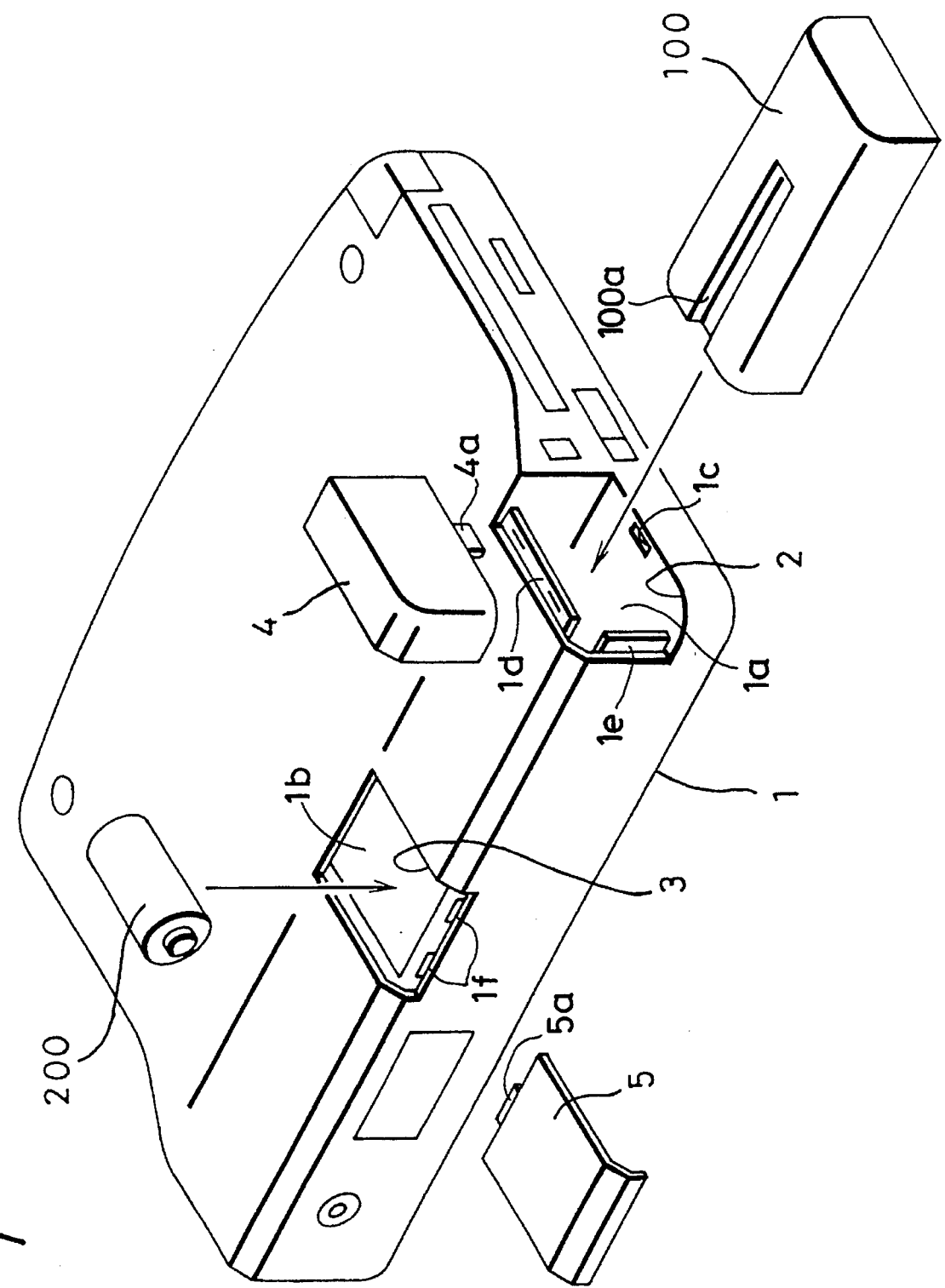
FIG. 1 is a perspective view showing an electronic device according to an embodiment of the present invention from the lower surface side.

FIG. 1 of the accompanying drawings shows an example of electronic device, e.g., portable information processing device from the lower surface side. As shown in FIG. 1, an electronic device includes a device body 1 having two kinds of batteries, i.e., an operation battery 100 for supplying an operation voltage to device elements constructing the electronic device, such as a signal processor or display provided within the electronic device and a memory backup battery 200 for backing up a memory disposed within the electronic device when the operation battery 100 is exchanged with a new one. The batteries 100 and 200 become power supplies for the electronic device. The device body 1 is arranged such that the two batteries 100 and 200 can be exchanged with new ones by the user freely.

The operation battery 100 is of a large rectangular solid-shaped type formed of a secondary battery or the like. When the operation battery 100 is horizontally slid into a first battery accommodating portion 1a of the device body 1 from an opening 2 defined on the side surface of the device body 1, the operation battery 100 is inserted into and accommodated in the first battery accommodating portion 1a. Incidentally, the operation battery 100 has a concave-shaped groove portion 100a formed on one surface thereof. Because the groove portion 100a and a projected portion (not shown) of the first battery accommodating portion 1a are engaged with each other, it becomes possible to prevent the operation battery 100 from inadvertently being inserted into the first battery accommodating portion 1a of the device body 1.

On the other hand, the memory backup battery 200 is of a small columnar-shaped type formed of a primary battery. The memory backup battery 200 is inserted into and accommodated in a second battery accommodating portion 1b of the device body 1 from an opening 3 defined on the bottom surface of the device body 1, i.e., from up to down in FIG. 1.

The openings 2, 3 are closed by battery lids 4, 5, respectively.

The battery lid 4 has an engagement projection 4a which is fitted into an engagement aperture 1c defined on the inner surface side of the opening 2 of the device body 1 when the battery lid 4 is detachably attached to the device body 1 at its position whereat it closes the opening 2 of the device body 1. Since the opening 2 is defined on one of the four corners of the device body 1, the battery lid 4 is composed of a rectangular flat plate portion and rising wall portions extended along two perpendicular sides of the rectangular flat plate portion so as to close the opening 2, though not shown. When the battery lid 4 is attached to the device body 1 so as to close the opening 2, the engagement projection 4a and the engagement aperture 1c are engaged with each other and the two rising wall portions (not shown) of the battery lid 4 are supported by projection portions 1d, 1e formed so as to project from the opening 2 of the device body 1. At that time, the battery lid 4 restricts the movement of the operation battery 100 such that an electrical connection between a terminal portion (not shown) of the operation battery 100 and a terminal (not shown) of the first battery accommodating portion 1a can be maintained.

The battery lid 5 has a cross section of substantially L-letter shape. The battery lid 5 has an engagement projection 5a formed on one end side thereof. When the battery lid 5 is attached to the device body 1 so as to close the opening 3, the engagement projection 5a is engaged with an engagement concave portion (not shown) formed on the peripheral portion of the opening 3 of the device body 1, thereby the battery lid 5 being attached to the device body 1. At that time, a pair of engagement projections (not shown) formed on the other side of the battery lid 5 are engaged with a pair of engagement apertures 1f, 1f defined on the peripheral edge portion of the opening 3. When the battery lid 5 is attached to the device body 1, the movement of the memory backup battery 200 to the direction in which the memory backup battery 200 is removed from the second battery accommodating portion 1b is restricted.

The first and second battery accommodating portions 1a and 1b are respectively formed on the bottom surface side of the device body 1 within a relatively short distance from each other.

In the electronic device into which the operation battery 100 and the memory backup battery 200 are detachably inserted, when the two batteries 100 and 200 are simultaneously removed from the first and second battery accommodating portions 1a and 1b, data that had been stored so far in the memory or the like provided within the electronic device are all lost. Therefore, the device body 1 incorporates therein the following mechanism in order to prevent the memory backup battery 200 from being inadvertently removed from the second battery accommodating portion 1b under the condition that the operation battery 100 is removed from the first battery accommodating portion 1a.

Figure 2A:
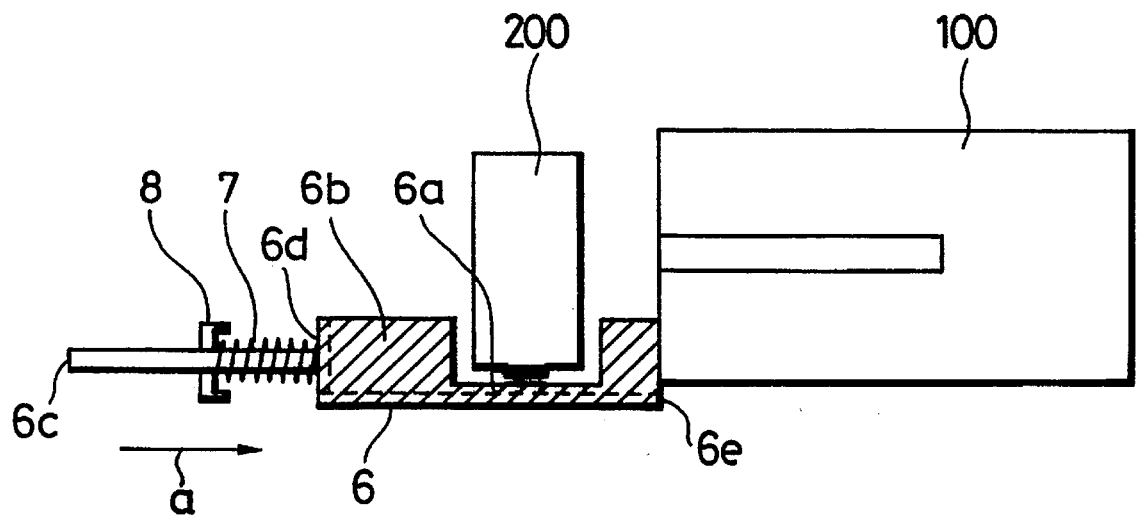
Figure 2B:
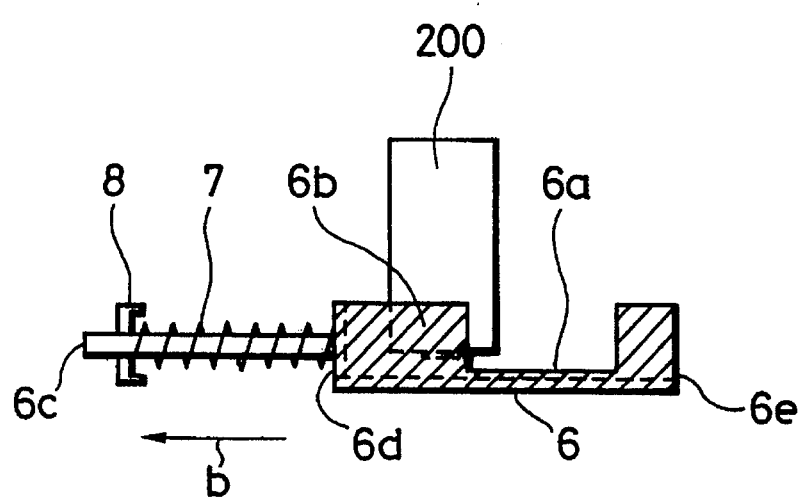

An inadvertent removal preventing mechanism of the memory backup battery 200 is arranged as shown in FIGS. 2A and 2B.

As shown in FIGS. 2A and 2B, this preventing mechanism includes a shutter member 6, a spring 7 and a spring bracket 8. The shutter member 6 is attached to the device body 1 such that it can freely slide along a guide portion (not shown) formed on the inside of the device body 1.

The shutter member 6 is composed of a recess portion 6a, a shielding plate portion 6b, a shaft portion 6c on which the spring 7 formed of a coil spring is inserted, a wall portion 6d and an operated portion 6e. The recess portion 6a and the shielding plate portion 6b are formed as flat plate portions made of plate members of substantially L-letter configuration in cross section. The recess portion 6a is of a size such that the memory backup battery 200, which is accommodated within the second battery accommodating portion 1b, can be removed from the second battery accommodating portion 1b as shown in FIG. 2A. The shutter member 6 has the operated portion 6e at its tip end portion of the direction in which the shutter member 6 is moved as shown by an arrow a in FIG. 2A. Under the condition shown in FIG. 2B, i.e. with operation battery 100 removed, a part of the operated portion 6e is projected into the first battery accommodating portion 1a as will be described later on. When the operation battery 100 is inserted into the first battery accommodating portion 1a, the operated portion 6e is pressed in the direction shown by an arrow b in FIG. 2B by the end portion of the tip end side of the direction in which the operation battery 100 is inserted. The wall portion 6d has the shaft portion 6c attached to its one end side of the plate-shaped member where the recess portion 6a and the shielding plate portion 6c are formed. The shaft portion 6c has the spring 7 inserted thereunto. The shaft portion 6c is supported by the spring bracket 8 attached to the inner surface of the device body 1 such that it can be moved as shown in FIGS. 2A and 2B. One end of the spring 7 is supported by the spring bracket 8 and the other end thereof is brought in contact with the wall portion 6d. The spring 7 constantly spring-biases the shutter member 6 in the direction shown by the arrow a in FIG. 2A.

The shielding plate portion 6b is disposed within a space formed by the upper surface of the memory backup battery 200 accommodated in the second battery accommodating portion 1b and the rear surface of the battery lid 5, i.e., the shielding plate portion 6b is disposed between the memory backup battery 200 and the inner surface of the device body 1. The shielding plate portion 6b is moved between the position shown in FIG. 2A and the position shown in FIG. 2B.

The inadvertent removal preventing mechanism thus arranged is operated as follows.

Figure 3A:
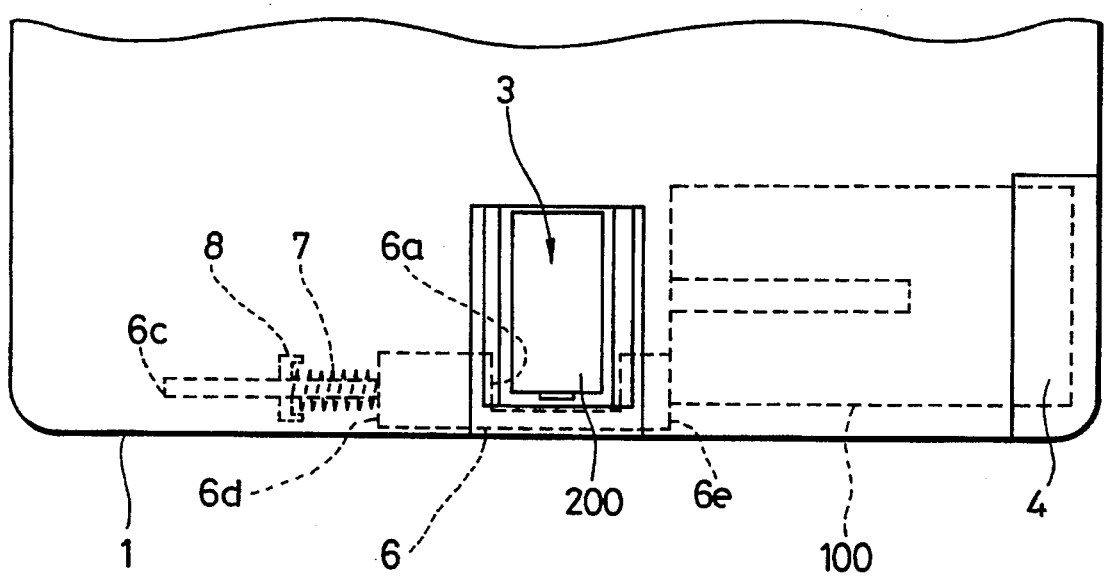
Figure 3B:
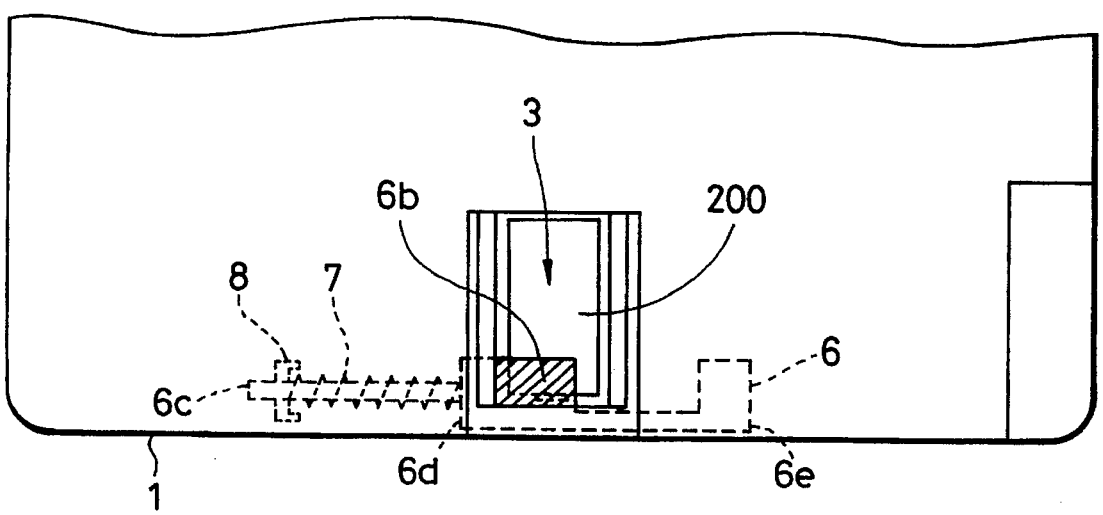

Initially, under the condition that the operation battery 100 is not accommodated within the first battery accommodating portion 1a, the shutter member 6 is set in the condition that the operated portion 6e thereof is projected into the first battery accommodating portion 1a as shown in FIG. 2B or FIG. 3B. If the operation battery 100 is inserted into the first battery accommodating portion 1a under this condition, the operated portion 6e is pressed at the tip end portion of the direction in which the operation battery 100 is inserted into the first battery accommodating portion 1a in the direction shown by the arrow b in FIG. 2B against a spring-biasing force of the spring 7. Under the condition that the operation battery 100 is completely accommodated in the first battery accommodating portion 1a, as shown in FIG. 2A or FIG. 3A, the recess portion 6a of the shutter member 6 is moved to the position opposing the memory backup battery 200. Under this condition shown in FIG. 2A or FIG. 3A, the battery lid 5 is detached from the device body 1 and the memory backup battery 200 can be removed from the second battery accommodating portion 1b.

Conversely, under the condition shown in FIG. 2A or FIG. 3A, if the battery lid 4 is detached from the device body 1 and the operation battery 100 is removed from the first battery accommodating portion 1a, then the shutter member 6 is moved in the direction shown by the arrow a in FIG. 2A under spring force of the spring 7, whereby a part of the memory backup battery 200 starts being covered with the shielding plate portion 6b. Thereafter, under the condition that the operation battery 100 is completely removed from the first battery accommodating portion 1a, as shown in FIG. 2B or FIG. 3B, at least a part of the memory backup battery 200 starts being covered with the shielding plate portion 6b. Under the condition shown in FIG. 2B or FIG. 3B, even though the user intends to remove the memory backup battery 200 from the second battery accommodating portion 1b, the shielding plate portion 6b can prevent the memory backup battery 200 from being removed from the second battery accommodating portion 1b. At that time, the shielding plate portion 6b is placed between the inner surface of the device body 1 and the memory backup battery 200.

As a consequence, the memory backup battery 200 is kept unremovable from the second battery accommodating portion 1b, i.e., the memory backup battery 200 can be prevented from being inadvertently removed from the second battery accommodating portion 1b under the condition that the operation battery 100 is removed from the first battery accommodating portion 100. Therefore, data stored in the memory or the like disposed within the device body 1 can be prevented from being lost inadvertently.

Under the condition shown in FIG. 3B, the user can visually confirm the shielding plate portion 6b of the shutter member 6 through the opening 3 so that the user can be warned so as not to remove the memory backup battery 200 from the second battery accommodating portion 1b. This warning effect becomes more powerful if the shutter member 6 is colored with proper warning color, such as red.

Under the condition shown in FIG. 3B, the user can directly move the shutter member 6 with the finger.

Specifically, if the user puts the finger into the opening 3 and moves the shielding plate portion 6b leftward in FIG. 3B against the spring force of the spring 7 with the fingertip extended between the shielding plate portion 6b and the opening 3 so that the shutter member 6 is placed in the state shown in FIG. 3, then the shutter member 6 is placed in the state that the recess portion 6a of the shutter member 6 can be opposed to the inserted portion of the memory backup battery 200, i.e., the state shown in FIG. 2A or FIG. 3A.

Under this condition, if the memory backup battery 200 is intentionally removed from the second battery accommodating portion 1b, then it is possible to intentionally erase data stored in the memory or the like disposed within the device body 1.

While the shutter member 6 is of the type capable of moving straight between the position shown in FIG. 3A and the position shown in FIG. 3B as described above, the present invention is not limited thereto and the shutter member 6 can be formed as a rotary type shutter member.

Furthermore, while a part of the memory backup battery 200 is covered with the shielding plate portion 6b as described above, the present invention is not limited thereto and the memory backup battery 200 can be wholly covered with the shielding plate portion 6b, i.e., the opening 3 can be closed. In that case, the memory backup battery 200 can be prevented from being removed from the second battery accommodating portion 1b intentionally.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An electronic device using an operation battery and a memory backup battery comprising:

a device body having a first accommodating portion in which said operation battery is accommodated and a second accommodating portion in which said memory backup battery is accommodated; and preventing means for preventing said memory backup battery accommodated in said second accommodating portion from being removed from said second accommodating portion when said operation battery is not accommodated in said first accommodating portion and enabling the memory backup battery accommodated in said second accommodating portion to be removed from said second accommodating portion under the condition that said operation battery is accommodated in said first accommodating portion, wherein said preventing means includes a closure member which is moved by the insertion of said operation battery into said first accommodating portion, to a position whereat the closure member uncovers said memory backup battery accommodated in said second accommodating portion and resilient means which normally moves the closure member to a position which covers at least a part of the memory backup battery accommodated in said second accommodating portion when said operation battery is removed from the first accommodating portion.

2. An electronic device using an operation battery and a memory backup battery comprising:

a device body having a first recess accommodating the operation battery and a second recess accommodating the memory backup battery;

a movable cover within the device body contacting the operation battery when it is inserted into the first recess so that the cover is moved to uncover the second recess and thereby allow the backup memory battery to be removed from the second recess; and resilient biasing means for normally moving the cover to a position covering at least a portion of the second recess in response to withdrawal of the operation battery from first recess to prevent removal of the memory backup battery from the second recess.

3. An electronic device using an operation battery and a memory backup battery according to claim 2, wherein the resilient biasing means includes a plunger connected to the cover, a coil spring coiled about the plunger, and a spring stop, so that when the cover is moved to uncover the second recess upon insertion of the operation battery into the first recess, the coil spring is compressed.

4. An electronic device using an operation battery and a memory backup battery comprising:

a first battery accommodating portion provided in a housing, said first battery accommodating portion accommodating therein said operation battery;

a second battery accommodating portion provided in said housing, said second battery accommodating portion accommodating therein said memory backup battery such that said memory backup battery can be removed therefrom; and preventing means for preventing said memory backup battery from being removed from said second battery accommodating portion when said operation battery is not accommodated in said first battery accommodating portion, wherein said preventing means includes a contact member which is contacted and moved by said operation battery when said operation battery is inserted into said first battery accommodating portion and a closure portion which is projected over at least a part of said memory backup battery accommodated in said second battery accommodating portion to prevent said memory backup battery accommodated in said second battery accommodating portion from being removed, wherein said closure portion is moved to a position whereat said memory backup battery accommodated in said second battery accommodating portion becomes able to be removed from said second battery accommodating portion when said contact member is moved by the insertion of the first battery into the first battery accommodating portion.

5. An electronic device according to claim 4, wherein said preventing means further includes spring-biasing means for biasing said contact member into said first battery accommodating portion under spring force.

6. An electronic device according to claim 4, wherein said housing includes a lid for opening and closing said second battery accommodating portion and said closure portion is disposed between said memory backup battery accommodated in said second battery accommodating portion and said lid.

7. An electronic device according to claim 4, wherein said closure portion can be manually moved to the position whereat said memory backup battery becomes able to be removed from said second battery accommodating portion.

* * * * *